US009923982B2

(12) United States Patent
FitzGerald

(10) Patent No.: US 9,923,982 B2
(45) Date of Patent: Mar. 20, 2018

(54) METHOD FOR VISUALIZING TEMPORAL DATA

(75) Inventor: Cary FitzGerald, Palo Alto, CA (US)

(73) Assignee: Avaya Inc., Basking Ridge, NJ (US)

( * ) Notice: Subject to any disclaimer, the term of this patent is extended or adjusted under 35 U.S.C. 154(b) by 589 days.

(21) Appl. No.: 13/168,716

(22) Filed: Jun. 24, 2011

(65) Prior Publication Data

US 2012/0331066 A1 Dec. 27, 2012

(51) Int. Cl.
*G06F 15/16* (2006.01)
*H04L 29/08* (2006.01)
*H04L 29/06* (2006.01)

(52) U.S. Cl.
CPC ............ *H04L 67/24* (2013.01); *H04L 65/403* (2013.01); *H04L 65/605* (2013.01)

(58) Field of Classification Search
CPC ....... H04N 7/155; H04L 67/24; H04L 65/605; H04L 65/403
USPC .......................................................... 709/204
See application file for complete search history.

(56) References Cited

U.S. PATENT DOCUMENTS

| | | | | |
|---|---|---|---|---|
| 5,717,869 A * | 2/1998 | Moran et al. ................. | 715/716 |
| 5,742,745 A * | 4/1998 | Sugikawa ........... | H04L 12/1813 |
| | | | 358/1.15 |
| 6,598,075 B1 * | 7/2003 | Ogdon ................ | H04L 12/1813 |
| | | | 348/E7.083 |
| 6,909,708 B1 * | 6/2005 | Krishnaswamy ..... | H04L 65/103 |
| | | | 370/352 |
| 7,466,334 B1 * | 12/2008 | Baba .................... | G11B 27/034 |
| | | | 348/14.06 |
| 7,647,555 B1 * | 1/2010 | Wilcox et al. ................ | 715/721 |
| 7,679,518 B1 * | 3/2010 | Pabla et al. ................ | 340/573.1 |
| 8,341,184 B2 * | 12/2012 | Bonev et al. ................. | 707/791 |
| 8,456,507 B1 * | 6/2013 | Mallappa et al. ......... | 348/14.08 |
| 8,458,462 B1 * | 6/2013 | Hanna .................... | H04L 63/10 |
| | | | 713/156 |
| 8,781,841 B1 * | 7/2014 | Wang ...................... | H04M 3/56 |
| | | | 379/205.01 |
| 2002/0067810 A1 * | 6/2002 | Barak ................... | H04M 1/656 |
| | | | 379/88.25 |
| 2003/0174826 A1 * | 9/2003 | Hesse ................. | H04L 12/1818 |
| | | | 379/210.01 |
| 2004/0107270 A1 * | 6/2004 | Stephens et al. ............ | 709/219 |
| 2004/0111639 A1 * | 6/2004 | Schwartz ............ | H04L 63/0245 |
| | | | 726/1 |

(Continued)

FOREIGN PATENT DOCUMENTS

WO 2009050618 4/2009

OTHER PUBLICATIONS

Wheless; CAVE6D: A Tool for Collaborative Immersive Visualization of Environmental Data; 4 pages.

(Continued)

*Primary Examiner* — Philip Chea
*Assistant Examiner* — Wing Ma
(74) *Attorney, Agent, or Firm* — Sheridan Ross P.C.

(57) ABSTRACT

In one embodiment, a method and system are provided that receive, during a selected time period, a plurality of different media streams exchanged, over a communications network, in one or more communications between a plurality of parties; and generate a multimedia presentation of the plurality of different media streams, wherein, in the multimedia presentation, the different media streams are referenced according to a common time scale.

20 Claims, 8 Drawing Sheets

(56) References Cited

U.S. PATENT DOCUMENTS

| | | | |
|---|---|---|---|
| 2004/0125133 A1* | 7/2004 | Pea et al. .................... 345/751 | |
| 2004/0153456 A1* | 8/2004 | Charnock et al. ............. 707/10 | |
| 2004/0215722 A1* | 10/2004 | Mukherjee .......... H04L 12/1813 | 709/205 |
| 2005/0034079 A1* | 2/2005 | Gunasekar et al. .......... 715/753 | |
| 2006/0004619 A1* | 1/2006 | Matheson ........................ 705/8 | |
| 2007/0106724 A1* | 5/2007 | Gorti ..................... G06Q 10/10 | 709/204 |
| 2007/0285504 A1* | 12/2007 | Hesse ...................... H04N 7/15 | 348/14.08 |
| 2007/0299927 A1* | 12/2007 | Knauerhase ............ H04L 51/04 | 709/206 |
| 2008/0022369 A1* | 1/2008 | Roberts ................ H04L 63/102 | 726/4 |
| 2008/0082669 A1* | 4/2008 | Williams ........... H04M 3/42221 | 709/227 |
| 2008/0095339 A1* | 4/2008 | Elliott ..................... H04L 12/14 | 379/93.01 |
| 2008/0112336 A1* | 5/2008 | Gray ...................... H04M 3/562 | 370/260 |
| 2008/0157994 A1* | 7/2008 | Morse ..................... G10L 19/00 | 340/7.61 |
| 2008/0189360 A1* | 8/2008 | Kiley ................ G06F 17/30867 | 709/203 |
| 2008/0189624 A1* | 8/2008 | Chotai et al. .................. 715/753 | |
| 2008/0215682 A1* | 9/2008 | Vilis ..................... H04L 63/101 | 709/204 |
| 2008/0229213 A1* | 9/2008 | Hamilton ............... G06Q 10/10 | 715/751 |
| 2008/0281971 A1* | 11/2008 | Leppanen ........... H04L 12/1818 | 709/228 |
| 2009/0016513 A1* | 1/2009 | Miller ............... H04M 3/42221 | 379/202.01 |
| 2009/0063645 A1* | 3/2009 | Casey ................ H04N 21/4788 | 709/206 |
| 2009/0086012 A1* | 4/2009 | Thapa ........................ 348/14.08 | |
| 2009/0160694 A1* | 6/2009 | Di Flora ............. H04L 12/5895 | 341/176 |
| 2009/0172150 A1* | 7/2009 | Alkov ............... G06F 17/30873 | 709/224 |
| 2009/0252312 A1* | 10/2009 | Muniz et al. ............. 379/112.01 | |
| 2009/0259954 A1 | 10/2009 | Chenthamarakshan et al. | |
| 2009/0270128 A1* | 10/2009 | Jheng ..................... H04W 12/06 | 455/558 |
| 2009/0281644 A1* | 11/2009 | Okamoto .......... G06F 17/30026 | 700/94 |
| 2009/0327415 A1* | 12/2009 | Alberth, Jr. ......... H04M 1/2745 | 709/204 |
| 2010/0002066 A1* | 1/2010 | Nelson ........................ 348/14.1 | |
| 2010/0053302 A1* | 3/2010 | Ivashin et al. .............. 348/14.08 | |
| 2010/0070860 A1* | 3/2010 | Alkov ................. G06F 17/3082 | 715/716 |
| 2010/0106504 A1* | 4/2010 | Agrawal .................. H04M 3/56 | 704/246 |
| 2010/0106748 A1* | 4/2010 | Schultz et al. ................. 707/803 | |
| 2010/0173618 A1* | 7/2010 | Kass et al. ................. 455/414.1 | |
| 2010/0180001 A1* | 7/2010 | Hardt ...................... G06F 11/32 | 709/207 |
| 2010/0191799 A1* | 7/2010 | Fiedorowicz ..... G06F 17/30873 | 709/203 |
| 2010/0232579 A1* | 9/2010 | Hearn ............................. 379/68 | |
| 2010/0322395 A1* | 12/2010 | Michaelis et al. ......... 379/88.14 | |
| 2010/0324946 A1* | 12/2010 | Ohmura ................ G06Q 10/02 | 705/5 |
| 2011/0040834 A1* | 2/2011 | Schaefer et al. ............. 709/204 | |
| 2011/0173235 A1* | 7/2011 | Aman ................. A63B 24/0021 | 707/792 |
| 2011/0185029 A1* | 7/2011 | Jain ...................... G06Q 10/109 | 709/207 |
| 2011/0202599 A1* | 8/2011 | Yuan ...................... H04L 67/22 | 709/203 |
| 2011/0206196 A1* | 8/2011 | Isaacson ................ G06Q 10/10 | 379/142.06 |
| 2011/0225013 A1* | 9/2011 | Chavez .................. G06Q 10/10 | 705/7.18 |
| 2011/0228921 A1* | 9/2011 | Singh .................. H04L 12/1831 | 379/202.01 |
| 2011/0247054 A1* | 10/2011 | Roberts ................ H04L 63/102 | 726/4 |
| 2011/0261147 A1* | 10/2011 | Goyal et al. ............... 348/14.08 | |
| 2011/0268263 A1* | 11/2011 | Jones ..................... H04M 3/563 | 379/202.01 |
| 2011/0268418 A1* | 11/2011 | Jones .................. H04L 12/1831 | 386/200 |
| 2011/0270609 A1* | 11/2011 | Jones ...................... H04M 3/56 | 704/235 |
| 2011/0270921 A1* | 11/2011 | Jones ..................... G06F 3/0421 | 709/204 |
| 2011/0270922 A1* | 11/2011 | Jones ..................... G06F 3/0486 | 709/204 |
| 2011/0270923 A1* | 11/2011 | Jones ..................... G06F 3/0421 | 709/204 |
| 2011/0270933 A1* | 11/2011 | Jones .................. H04L 12/1822 | 709/206 |
| 2011/0271192 A1* | 11/2011 | Jones ..................... G06F 3/0421 | 715/727 |
| 2011/0271197 A1* | 11/2011 | Jones .................... G06Q 10/101 | 715/739 |
| 2011/0271207 A1* | 11/2011 | Jones ..................... H04W 4/206 | 715/753 |
| 2011/0271209 A1* | 11/2011 | Jones .................. H04L 12/1827 | 715/753 |
| 2011/0271210 A1* | 11/2011 | Jones .................. H04L 12/1827 | 715/753 |
| 2011/0271332 A1* | 11/2011 | Jones ..................... H04L 9/3247 | 726/7 |
| 2011/0288962 A1* | 11/2011 | Rankin, Jr. ........ G06F 17/30525 | 705/27.1 |
| 2011/0289161 A1* | 11/2011 | Rankin, Jr. .......... G06Q 10/107 | 709/206 |
| 2011/0320958 A1* | 12/2011 | Kashi .......................... 715/751 | |
| 2012/0002002 A1* | 1/2012 | Shaffer et al. ............. 348/14.09 | |
| 2012/0030368 A1* | 2/2012 | John ..................... G06F 17/214 | 709/231 |
| 2012/0066736 A1* | 3/2012 | Labrador et al. .................. 726/1 | |
| 2012/0096394 A1* | 4/2012 | Balko .................... G06F 3/0482 | 715/790 |
| 2012/0148034 A1* | 6/2012 | Ferguson .............. H04M 1/7255 | 379/88.14 |
| 2012/0158849 A1* | 6/2012 | Yoakum et al. .............. 709/205 | |
| 2012/0179465 A1* | 7/2012 | Cox .................... H04L 12/1822 | 704/235 |
| 2012/0274730 A1* | 11/2012 | Shanmukhadas ...... H04N 7/147 | 348/14.08 |
| 2012/0296914 A1* | 11/2012 | Romanov et al. ............. 707/741 | |
| 2012/0306993 A1* | 12/2012 | Sellers-Blais ............. 348/14.08 | |
| 2012/0314849 A1* | 12/2012 | Leblanc ............. H04M 3/42221 | 379/88.23 |
| 2012/0317215 A1* | 12/2012 | Brunner ................ G06Q 10/107 | 709/206 |
| 2013/0145271 A1* | 6/2013 | Desai et al. ................... 715/727 | |
| 2014/0250173 A1* | 9/2014 | Shetty ........................... 709/204 | |

OTHER PUBLICATIONS

Daassi; A taxonomy of temporal data visualization techniques; Laboratoire Clips-IMAG, Genoble France; 22 pages.

Wikipedia; Comparison of instant messaging protocols; printed from http://en.wikipedia.org/wiki/Comparison_of_instant_messaging_protocols; on Mar. 11, 2010; 2 pages.

Avaya Support—MultiPoint Conferencing Unit—Product; printed from http://support.avaya.com/css/Products/P0061; 5 pages.

Avaya Web Conferencing Quick Reference Guide; printed from http://docs.google.com/viewer?a=v &q=cache:5s4VBBzeX3cJ:support.avaya.com/css/P8/do . . . ; printed Mar. 6, 2010; 2 pages.

(56) References Cited

OTHER PUBLICATIONS

Avaya, Polycom Partner on Desktop Video Conferencing—Messaging and Collaboration . . . ; printed from http://www.eweek.com/c/a/Messaging-and-Collaboration/Avaya-Poycom-Partner-on-Deskt . . . ; printed Mar. 6, 2010; 3 pages.

Avaya Meeting Exchange Conferencing Servers; printed from http://docs.google.com/viewer?a=v&q=cache:y9D0qCke8VYJ:www.nacr.com/uploadedFile . . . ; printed Mar. 6, 2010; 2 pages.

Avaya conferencing bridge for Audio Teleconferencing Solutions; printed from http://www.conference-bridge.net/catalog/product/700359946.aspx; printed Mar. 6, 2010; 4 pages.

Avaya Web Conferencing Web-based collaboration tools for virtual meetings; Fact Sheet 2009; 2 pages.

Avaya CS700 Conferencing Server Avaya CS780 Conferencing Server; printed from http://docs.google.com/viewer?a=v&q=cache:hwXhNyZeg38J.www.conference bridges.co . . . ; printed Mar. 6, 2010; 2 pages.

Avaya Unified Conferencing; printed from http://www.avaya.com/usa/product/unified-conferencing; printed Mar. 6, 2010; 2 pages.

Avaya Unified Conferencing; Features and Benefits; printed from http://www.avaya.com/usa/product/unified-conferencing?view=features-benefits; printed Mar. 6, 2010; 2 pages.

Avaya Video Communications; printed from http://www.avaya.com/usa/product/video-communications; printed Mar. 6, 2010; 2 pages.

Avaya Aura (TM); printed from http://www.avaya.com/usa/product/avaya-aura; printed Mar. 6, 2010; 5 pages.

* cited by examiner

METHOD FOR VISUALIZING TEMPORAL DATA

FIELD

The disclosure relates generally to organizing multimedia information and particularly to organizing temporally changing information.

BACKGROUND

Communications today provide a myriad of temporally dependent, recorded multimedia information. For example, multimedia conference sessions can include video information, such as participant video images and/or power point presentations, and audio information, such as each participant's oral comments. The various participants can exchange, during and as part of the multimedia conference session, emails and instant messages and can use different communication options to communicate selectively and privately with a subset of participants. A participant can take notes during the conference session or otherwise mark points during the session for later reference.

Current conference session applications record some of this information in a linked manner but are unable to link seemingly independent communication threads or channels between a subset of participants and other information, such as participant notes. Even the information that is linked is often not presented historically to a participant in a comprehensible, entertaining, or otherwise user friendly manner.

SUMMARY

These and other needs are addressed by the various embodiments and configurations of the present disclosure.

In one embodiment, a method and system are provided. The method and system:

(a) receive, during a selected time period, a plurality of different media streams exchanged, over a communications network, in one or more communications between a plurality of parties; and (b) generate a multimedia presentation of the plurality of different media streams.

The multimedia presentation includes a plurality of display segments associated with a number of: (i) sequential video images from the different media streams, (ii) one or more audio streams from the different media streams, (iii) one or more text messages from the different media streams, and (iv) information accessed and/or created by one of the parties. The information is not included in the different media streams. In the multimedia presentation, the different display elements or media streams are referenced according to a common time scale.

The different media streams are typically associated with a multimedia session between the parties. In this context, the different media streams include one or more of an audio conversation between two or more of the parties, video images of at least one or more of the parties, instant messages exchanged between two of more of the parties, email messages exchanged between two or more of the parties, text chat messages exchanged between two or more of the parties, keyboard chat between two or more of the parties, whiteboard session, desktop sharing session, application sharing session, and power point session.

In a second embodiment, a method and system are provided that:

(a) receive a request to record one or more media streams exchanged in a conference session between multiple participants;

(b) determine that at least one communication transmitted, by one of the multiple participants, during the conference session, is related to the conference session, wherein the at least one communication is not transmitted as part of the conference session;

(c) associate a recorded version of the at least one communication with the recorded one or more media streams; and (d) any other temporal data stream, which could be a data source such as a stock quote, news feed, computer performance data, or other arbitrary temporal data stream.

A participant can take notes before, during, or after the conference session or otherwise mark points during the session for later reference.

The present disclosure can provide a number of advantages depending on the particular configuration. By way of example, the principles of this disclosure can organize temporally the various media streams of a multimedia meeting and permit the organized media streams to be marked before, during or after the meeting. The organized media streams can be viewed in an interesting, comprehensible, relevant, editable, and manipulable format. The disclosure further discloses not only how to record the conference session media streams but also to identify and link the recorded streams with seemingly independent but related communication threads or channels involving one or more of the participants.

These and other advantages will be apparent from the disclosure.

The phrases "at least one", "one or more", and "and/or" are open-ended expressions that are both conjunctive and disjunctive in operation. For example, each of the expressions "at least one of A, B and C", "at least one of A, B, or C", "one or more of A, B, and C", "one or more of A, B, or C" and "A, B, and/or C" means A alone, B alone, C alone, A and B together, A and C together, B and C together, or A, B and C together.

The term "a" or "an" entity refers to one or more of that entity. As such, the terms "a" (or "an"), "one or more" and "at least one" can be used interchangeably herein. It is also to be noted that the terms "comprising", "including", and "having" can be used interchangeably.

The term "automatic" and variations thereof, as used herein, refers to any process or operation done without material human input when the process or operation is performed. However, a process or operation can be automatic, even though performance of the process or operation uses material or immaterial human input, if the input is received before performance of the process or operation. Human input is deemed to be material if such input influences how the process or operation will be performed. Human input that consents to the performance of the process or operation is not deemed to be "material".

The term "computer-readable medium" as used herein refers to any tangible storage and/or transmission medium that participate in providing instructions to a processor for execution. Such a medium may take many forms, including but not limited to, non-volatile media, volatile media, and transmission media. Non-volatile media includes, for example, NVRAM, or magnetic or optical disks. Volatile media includes dynamic memory, such as main memory. Common forms of computer-readable media include, for example, a floppy disk, a flexible disk, hard disk, magnetic tape, or any other magnetic medium, magneto-optical medium, a CD-ROM, any other optical medium, punch cards, paper tape, any other physical medium with patterns of holes, a RAM, a PROM, and EPROM, a FLASH-EPROM, a solid state medium like a memory card, any other memory chip or cartridge, a carrier wave as described hereinafter, or any other medium from which a computer can read. A digital file attachment to e-mail or other self-contained information archive or set of archives is considered a distribution medium equivalent to a tangible storage medium. When the computer-readable media is configured as a database, it is to be understood that the database may be any type of database, such as relational, hierarchical, object-oriented, and/or the like. Accordingly, the disclosure is considered to include a tangible storage medium or distribution medium and prior art-recognized equivalents and successor media, in which the software implementations of the present disclosure are stored.

The term "conference" or "conference session" refers to a single- or multimedia voice call or other type of session among three or more parties. As will be appreciated, the conference session can be circuit- or packet-switched. Any suitable protocol can be used, such as a digital control protocol, H.323, the Session Initiation Protocol ("SIP"), Media Gateway Protocol ("MGCP"), Realitime Transport Protocol ("RTP"), and Session Description Protocol ("SDP").

The terms "desktop sharing" or "application sharing" or "remote desktop sharing" refer a user controlling, by remote control software, a local computer from a remote location via a network connection. The remote control software is installed at both ends and typically both local and remote users can control the machine. Each user sees the same screen display as if they were both looking at the same machine.

The terms "determine", "calculate" and "compute," and variations thereof, as used herein, are used interchangeably and include any type of methodology, process, mathematical operation or technique.

The terms "instant message" and "instant messaging" refer to a form of real-time text communication between two or more people, typically based on typed text. An instant message is conveyed in accordance with an instant messaging protocol, such as Emesene Server, Gadu-Gadu, Gale, IRC, Microsoft Messenger Service, MSNP, OSCAR, PSYC (Protocol for SYnchronous Conferencing), RVP, SIP/SIMPLE, Skype, TOC, TOC2, XMPP, YMSG, and Zephyr.

The term "module" as used herein refers to any known or later developed hardware, software, firmware, artificial intelligence, fuzzy logic, or combination of hardware and software that is capable of performing the functionality associated with that element. Also, while the disclosure is presented in terms of exemplary embodiments, it should be appreciated that individual aspects of the disclosure can be separately claimed.

The term "pivot" is the axis that the viewer of the data is using to arrange the data. By way of illustration, if a viewer is thinking about the data as a set of powerpoint slides then the powerpoint slides are the pivot. If the viewer is thinking about sidebar conversations via instant messaging then the pivot is the pivot.

The term "presence information" refers to any information associated with a network node and/or endpoint device, such as a communication device, that is in turn associated with a person or identity. Presence information can indicate user status (e.g., online or offline), user availability (e.g., available, busy, on the phone, or out to lunch), user's desired contact means (e.g., instant messaging, circuit-switched telephone, packet-switched telephone, cell phone, pager, etc.) that may vary by contactor identity and/or contact time, and at what endpoint a contactor is most likely to reach successfully the presence service subscriber. Presence information can span a number of different communication channels. The aggregated view of a user's presence (that is, the availability across all of an individual's SIP-enabled devices) is called Multiple Points of Presence or MPOP. Examples of information useful in determining a user's presence and availability include information regarding the accessibility of the endpoint device, the recency of use of the endpoint device by the person, recency of authentication by the person to a network component, recency of registration of an endpoint device, an endpoint publishing presence information, SUBSCRIPTION requests generated by a user agent in the user's endpoint device, geographical location of the user using mobile device location information, scheduled activities on the user's calendar, indications whether or not a user has been reading or sending email, and an indication whether the user's email application has an out of office setting. Presence information can be, for example, the electronic address of a device at which the service subscriber is currently deemed to be present and/or available.

The term "whisper page" is a form of enhanced intrusion. The capability enables selected parties to intrude on calls that are already in progress. The intruding party intrudes on the existing call and all parties hear a tone. The speech path is enabled between the intruding party and the called extension, the other party is forced onto hold and will not hear the conversation. On completion of the intrusion, the called party speech path is reconnected to the original connected party.

The term "whiteboard" or "electronic blackboard" refers to a common area between applications and users in which mutually information is stored in a standard form that all conference session participants can access.

The preceding is a simplified summary of the disclosure to provide an understanding of some aspects of the disclosure. This summary is neither an extensive nor exhaustive overview of the disclosure and its various embodiments. It is intended neither to identify key or critical elements of the disclosure nor to delineate the scope of the disclosure but to present selected concepts of the disclosure in a simplified form as an introduction to the more detailed description presented below. As will be appreciated, other embodiments of the disclosure are possible utilizing, alone or in combination, one or more of the features set forth above or described in detail below.

DETAILED DESCRIPTION

Figure 1:
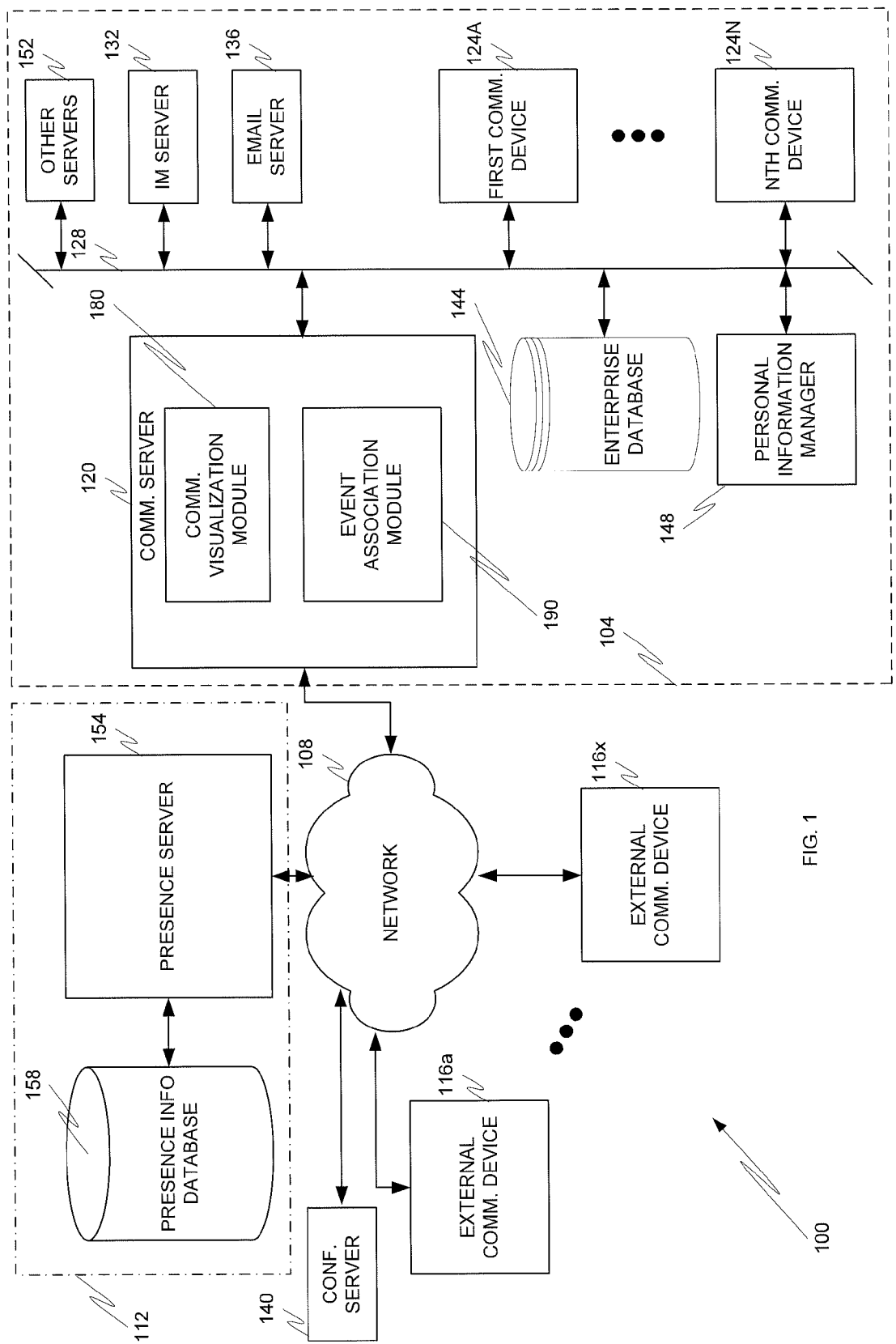
FIG. 1 is a block diagram of a network architecture according to an embodiment.

The disclosure, in one embodiment, provides a system and method to record various types of related information and associate and present the recorded information to a user in a useful, convenient, and manipulable manner. For example, a conference system using the concepts of this disclosure can record the media and/or multimedia streams exchanged by the various participant nodes to a conference session, identify and record distinct communication threads or channels involving one or more conference participants that are related to the session, and associate, or link, the various forms of recorded information together in a form that is viewable and manipulable by a user.

The various embodiments and configurations in this disclosure will be illustrated below in conjunction with an exemplary communication system. Although well suited for use with, e.g., a system using a server(s) and/or database(s), the invention is not limited to use with any particular type of communication system or configuration of system elements. Those skilled in the art will recognize that the disclosed techniques may be used in any application in which it is desirable to collect and associate related and temporally changing media and/or multimedia information for presentation to a user.

Furthermore, while the exemplary embodiments illustrated herein show the various components of the system collocated, certain components of the system can be located remotely, at distant portions of a distributed network or within a dedicated system. Thus, it should be appreciated, that the components of the system can be combined in to one or more devices, such as a server, or collocated on a particular node of a distributed network, such as an analog and/or digital telecommunications network, a packet-switch network, or a circuit-switched network. It will be appreciated from the preceding description, and for reasons of computational efficiency, that the components of the system can be arranged at any location within a distributed network of components without affecting the operation of the system. For example, the various components can be located in a switch such as a PBX and media server, gateway, in one or more communications devices, at one or more users' premises, or some combination thereof. Similarly, one or more functional portions of the system could be distributed between a telecommunications device(s) and an associated computing device. The components can further be located in an application server or communication device, such as one having Voice over Internet Protocol or other packet-switched call and/or video capabilities.

Furthermore, it should be appreciated that the various links connecting the elements can be wired or wireless links, or any combination thereof, or any other known or later developed element(s) that is capable of supplying and/or communicating data to and from the connected elements. These wired or wireless links can also be secure links and may be capable of communicating encrypted information. Transmission media used as links, for example, can be any suitable carrier for electrical signals, including coaxial cables, copper wire and fiber optics, and may take the form of acoustic or light waves, such as those generated during radio-wave and infra-red data communications.

Also, while the flowcharts have been discussed and illustrated in relation to a particular sequence of events, it should be appreciated that changes, additions, and omissions to this sequence can occur without materially affecting the operation of the disclosed embodiments, configuration, and aspects.

FIG. 1 depicts an architecture 100 according to an embodiment. Referring to FIG. 1, an enterprise network 104 is in communication, via packet-switched external network 108, with a presence service 112, a conference server 140, and a plurality of external communication devices 116a-x. The enterprise network 104 includes a communications server 120, an instant message server 132, an email server 136, other servers 152, an enterprise database 144, a personal information manager 148, and a plurality of internal first, second, . . . nth communications devices 124a-n, interconnected by a network 128. The communications server 120 can include a PBX, an enterprise switch, an enterprise server, or other type of telecommunications system switch or server. The communication server 120 is preferably configured to execute telecommunication applications such as the suite of MultiVantage™ or Aura™ applications of Avaya, Inc., including Communication Manager™, Aura Communication Manager™, Avaya IP Office™, and MultiVantage Express™.

The instant messaging server 132 can support any suitable instant messaging application, such as AOL™, MSN Messenger™, Yahoo! Messenger™, Live Messenger™, and Apple's iChat™.

The email server 136 can support any suitable email application, such as Microsoft Outlook™.

The personal information manager 148 contains subscriber personal information, such as electronic calendars, such as Outlook™ by Microsoft, Inc. The electronic calendar, as will be appreciated, includes scheduled events indexed by date and time.

The other servers 152 include a variety of application servers, including facsimile servers and messaging servers (such as Avaya Inc.'s Unified Messaging™ server). Other types of application servers can provide a temporal data stream, such as a stock quote, news feed, computer performance data, or other types of arbitrary temporal data streams.

The first, second, . . . nth communication devices 124a-n can be any IP-capable hard- or softphone and/or digital telephone modified to perform the operations of the present invention. Examples of suitable modified IP telephones include the 1600™, 2400™, 4600™, 5400™, 5600™, 9600™, 9620™, 9630™, 9640™, 9640G™, 9650™, and Quick Edition™ telephones, IP wireless telephones (such as Avaya Inc.'s IP DECT™ phones), video phones (such as Avaya Inc.'s Videphone™), and softphones of Avaya, Inc.

The enterprise database 144 includes enterprise subscriber information, such as name, job title, electronic address information (e.g., telephone number, email address, instant messaging handle, direct dial extension, and the like), subscriber contact lists (e.g., contact name and electronic address information), other employee records, and the like.

The presence service 112 includes a presence server 154 and an associated presence information database 158 that may or may not be operated by (or be external to) the enterprise network. The presence server 154 and presence information database 158 collectively track the presence and/or availability of presence service subscribers and/or their communication devices and provide, to requesting entities, current presence information respecting selected presence service subscribers. As will be appreciated, when the presence service 112 is external to the enterprise the presence service subscribers are different from the enterprise subscribers.

The external communication devices 116a-x can be any suitable circuit- or packet-switched or digital (e.g., TDM-enabled) communication device. Examples include wired and wireless telephones, Personal Digital Assistants or PDAs, Personal Computers or PCs, laptops, packet-based H.320 video phones and conferencing units, packet-based voice messaging and response units, peer-to-peer based communication devices, and packet-based traditional computer telephony adjuncts.

The network 108 is preferably a public packet-switched and/or circuit-switched network or set of networks. In one configuration, the network 108 is a public network supporting the TCP/IP suite of protocols.

The conferencing server 140 can be any suitable conferencing server, such as a 1056-port CS700 and CS780 Conferencing Server™ of Avaya, Inc. The conferencing server 140 typically includes conferencing bridge functionality, one or more conferencing applications, and associated hardware, such as MultiPoint Conferencing Units™ (MCU), Unified Conferencing™, Web Conferencing™, IP Office Conferencing™, and/or Meeting Exchange™ of Avaya, Inc. As will be appreciated, these products provide integrated features such as audio and web conference session management, power point push, document annotation and other annotation tools, text chat, desktop and application sharing, polling with instant tabulation, interactive whiteboard session, and conference session recording and playback of audio and web portions of the conference session. The products can enable streamed video from presenters, such as using a webcam, and provide a roster display of participants, a discussion window that provides keyboard chatting that can be private between participants or broadcast and visible to all participants, a capability that enables a host to promote a participant to host status so the participant can control the conference session, recording and playback of audio and web portions of the conference session, and LDAP integration of corporate directories and databases. The host can identify speakers, mute selected or all participants, (forcefully) disconnect selected participants, start and stop synchronized recording of the conference session, and synchronize recording of combined web and audio streams. The conferencing application can provide conference session security by means of a conference session URL and security code. As will be further appreciated, all or part of the functionality of the conferencing server 140 can be included within the communication server 120 and/or otherwise located on the network 128.

With reference to FIGS. 1 and 9, included in the memory of the communication server 120 (or located in one or more other network nodes on the networks 108 and 128) are a communication visualization module 180 and event association module 190. The communication visualization module 180 receives real-time (relative to an event), historical (or collected before the event), and/or later (or collected after the event) multimedia information (or collected data) 800 from the event association module 190 and creates a visualization object 804 for the collected data 800. The visualization object 804 includes not only the collected data 800 but also access, temporal and other control settings, such as the scanning system (e.g., progressive or interlaced scanning, the number of frames or fields per second, the resolution, the encoding algorithm, if any, and the like) and formatting commands (which specify not only the formatting of various display segments but also the presentation of the information to the user). The event association module 190 identifies relationships between otherwise discrete or unrelated sets of information, such as communication threads or channels, created documents, conference session audio and/or video streams, and the like.

The presentation of the contents of the visualization object will be discussed with reference to FIGS. 2-4.

Figure 2:
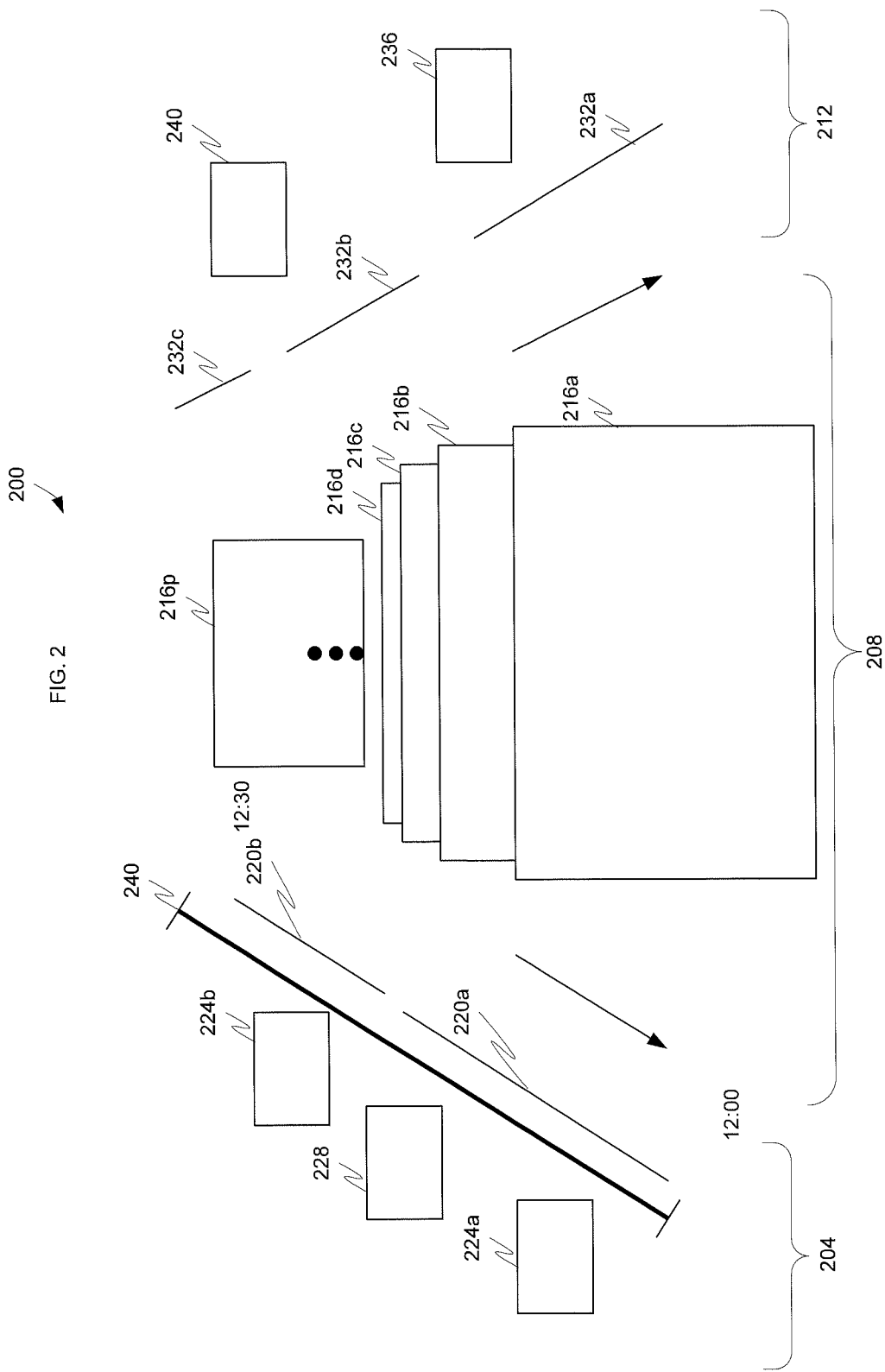
FIGS. 2-4 depict a visual presentation modality according to an embodiment.

With reference to FIG. 2, each of the frames 200 is divided into a series of subframes or frame or display segments 204, 208, and 212. Each of the display segments is an area of the frame set aside for a special purpose.

Display segment 208 is a pivot for the displayed information. In the figure, the pivot or primary display segment contains the various video images 216a-p of a sequentially and temporally changing graphical display, such as the slides of a presentation material, white boarding images, text chat messages, participant annotated documents, desktop displays, application displays, videos of each participant to a video conference call, and the like. In secondary display segment 204, a segmented audio stream 220 associated with a first session participant and a series of instant messages 224a,b between session participants and an email 228 (or alternatively a keyword instance flag identified by the conferencing application at the request of a subscriber or a flag, indicator or mark inputted or added by a viewer to mark a selected location) from a participant to a nonparticipant are depicted. In the secondary display segment 212, a segmented audio stream 232 associated with a second participant, a note document 236 generated by the host before, during and/or after the conference session and a text chat or keyboard chat message 240 shared between two or more session participants are depicted.

As will be appreciated, the user could alternatively choose to use, as the pivot, instant messages 224a,b, email 228, note document 236, audio stream 220 or 232, and/or text chat or keyboard chat message 240. In that event, the selected pivot would be displayed in the primary display segment 208 and the other data, namely video images 216a-p and unselected ones of the instant messages 224a,b, email 228, note document 236, and/or text chat or keyboard chat message 240 in the secondary display segments 204 and 212. For example, if the user selects instant messages 224a,b as the pivot, the video images 216a-p would be moved, in a time sequenced manner, to the secondary display segment 204, and the instant messages 224a,b would be moved, in a time sequenced manner, to the primary display segment 208. Selection of the pivot can be done, for example, using a "change pivot" icon preceded or followed by selection of the new pivot.

A common timeline 244 is depicted showing a selected time interval (12:00 pm to 12:30 pm) of the conference session. In other words, the contents of the various segments 204, 208, 212 are indexed to the timeline. For example, the instant messages 224a,b, email 228, and message 240 are indexed based upon either sent or receipt timestamp, the note document 236 based upon creation time (e.g., first or last changed timestamp), the various images 216a-p based upon initial displayed (or media stream receipt) timestamp, and audio streams 220 and 232 based on media stream receipt timestamp (at a common node or server).

Depending on the configuration or user preferences, the solid lines of the segmented audio streams 220 and 232 indicate when the respective participant was speaking or silent and the areas between the lines indicate when the respective participant was silent or speaking. Typically, the solid line indicates the amount of time that the conferencing application or bridge is receiving speech input from the respective participant. The association of a participant with a corresponding audio stream can be done by known techniques, such as by speaker enabled triangulation where multiple participants are in a common room or by audio or video stream isolation when each of the participants is in a separate room or a combination of these.

The arrows indicate that the user perceives, as the frames are played, that the contents of the various segments 204, 208, and 212 are moving through time towards him or her.

As can be seen from FIG. 2, the viewer is able to view current and future audio and video information in each frame. In one configuration, the viewer is able to view not only current and future but also past or historic audio and video information in each frame.

In one configuration, a "snap-to-event" icon permits the user to select an event. The event is something along the pivot that the user uses to navigate to the point in the media stream that he or she is interested in. With reference to FIG. 2, the selected event can be any of the instant messages 224a,b, email 228, note document 236, audio stream 220 or 232, text chat or keyboard chat message 240, or video images 216a-p. Selection of the event can be done, for example, using a "snap-to-event" pivot" icon preceded or followed by selection of the event.

Figure 3:
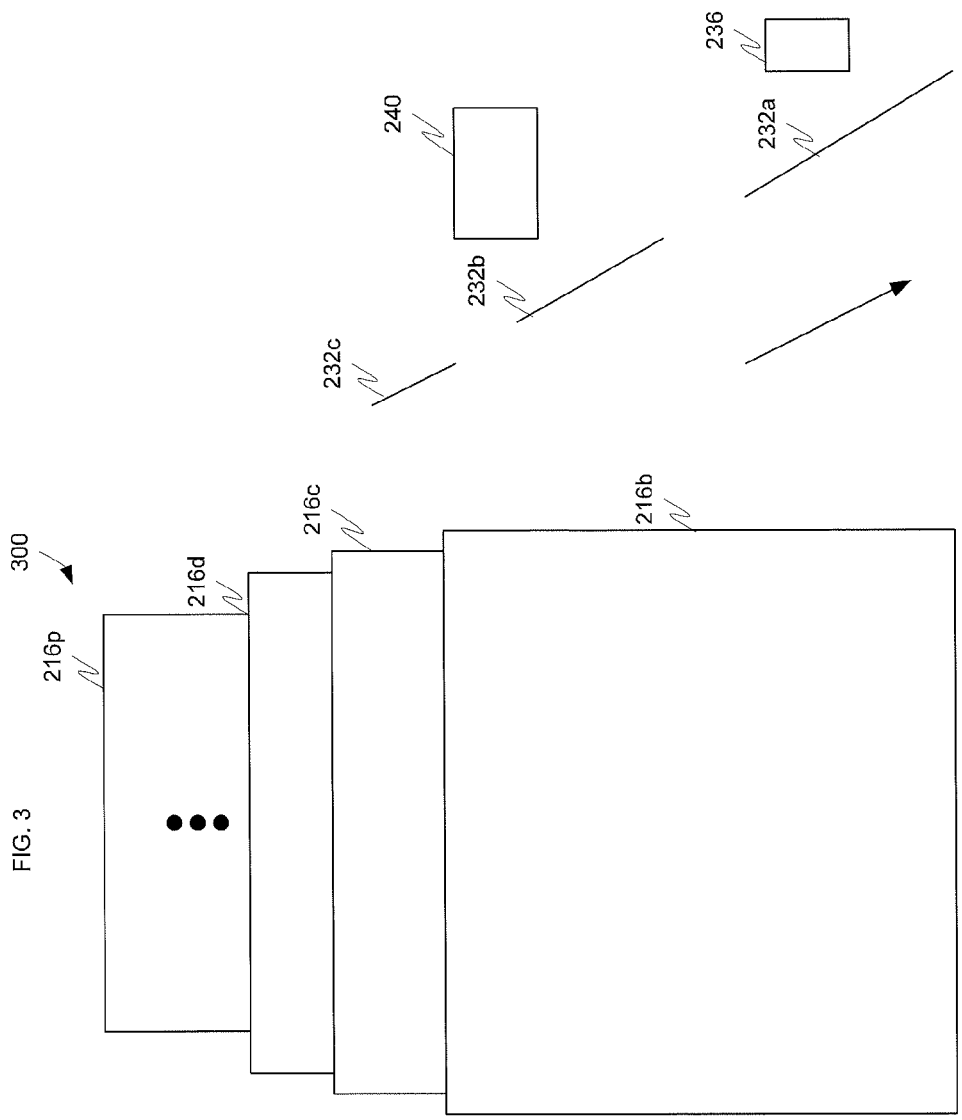

Referring to FIG. 3, an exemplary subsequent frame 300 is depicted. The subsequent frame 300 may be the next frame or separated from the frame 200 by multiple intervening frames. As can be seen from the timeline 240, approximately ten minutes has elapsed since the earliest time shown in frame 200. The video images 216b-p remain in view, with image 216a having passed from view (towards the user).

Figure 4:
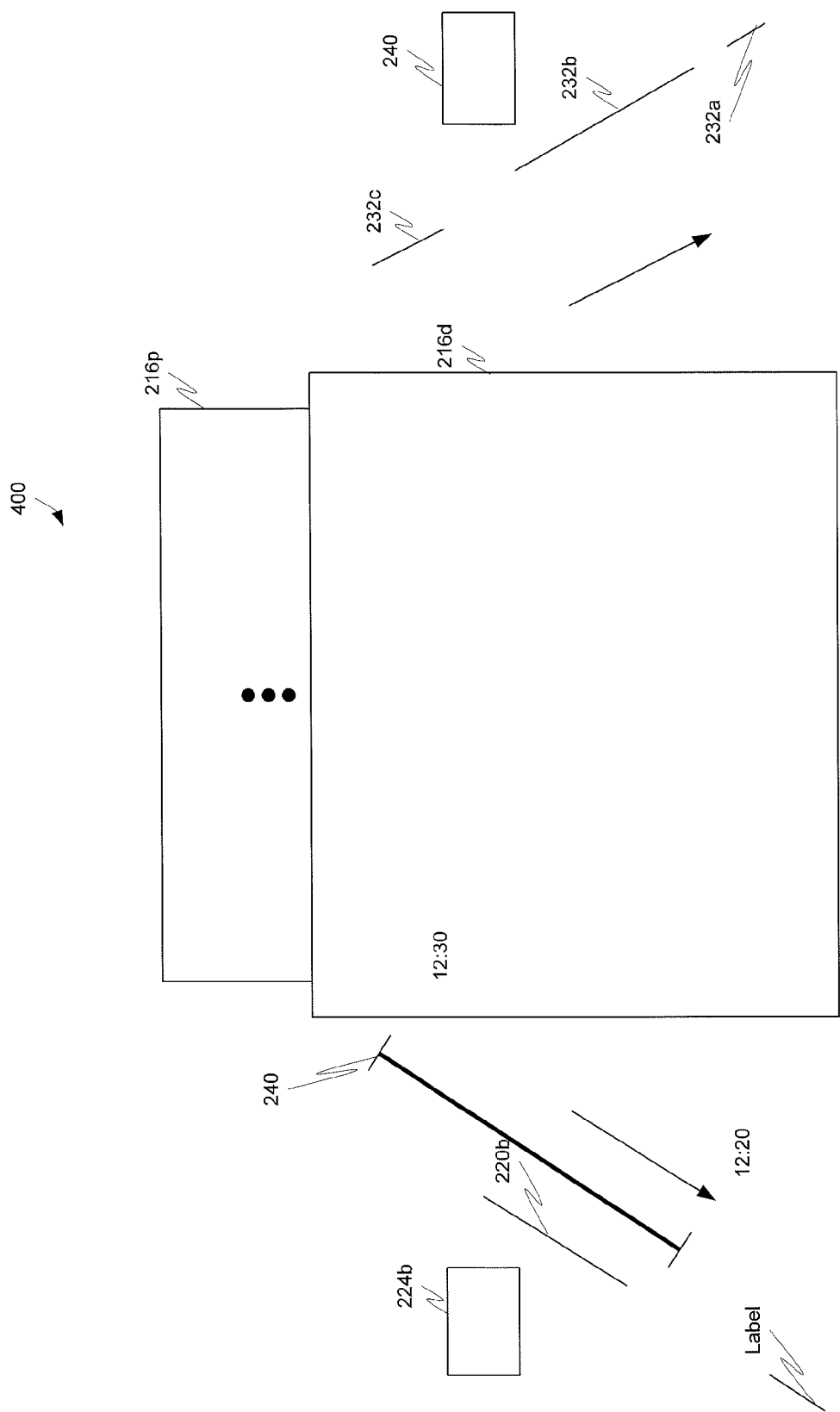

Referring to FIG. 4, an exemplary subsequent frame 400 is depicted. The subsequent frame 400 may be the next frame or separated from the frame 300 by multiple intervening frames. As can be seen from the timeline 240, approximately ten minutes has elapsed since the earliest time shown in frame 300. The video images 216d-p remain in view, with images 216a-c having passed from view (towards the user). Also passed from view are the audio segment 220b, instant message 224a, email 228 and note document 236.

Although FIGS. 2-4 show the primary and secondary segments show different media types, it is to be understood that they can show a common media type, depending on the requirements of the application.

The temporal controls 816 for the presentation of the visualization object depend on the application. Typical temporal controls include fast forward (i.e., the forward operation of the "snap-to-event" icon), slow (e.g., frame-by-frame) forward, fast reverse (i.e., the reverse operation of the "snap-to-event" icon), slow (e.g., frame-by-frame) reverse, play, pause, and stop. Other temporal controls include a chronology of all of the objects in the depicted event. The user can access temporal controls to jump to a specific point in time, including going back in time. For example, a cursor (not shown) can be used by a user to change the pivot display segment. For example, the cursor could click on secondary frame 204 and cause it to become the pivot display segment and display segments 208 and 212 to become the secondary display segments. Additionally, the user could select, by clicking the cursor, an image or audio stream segment to view in exploded view or to listen to, respectively. Alternatively, the cursor could click on a selected early or later point on the time line 240. In any of the above examples, the visualization object fast forwards to the frame having the timestamp associated with the selected image or audio stream segment.

Figure 5:
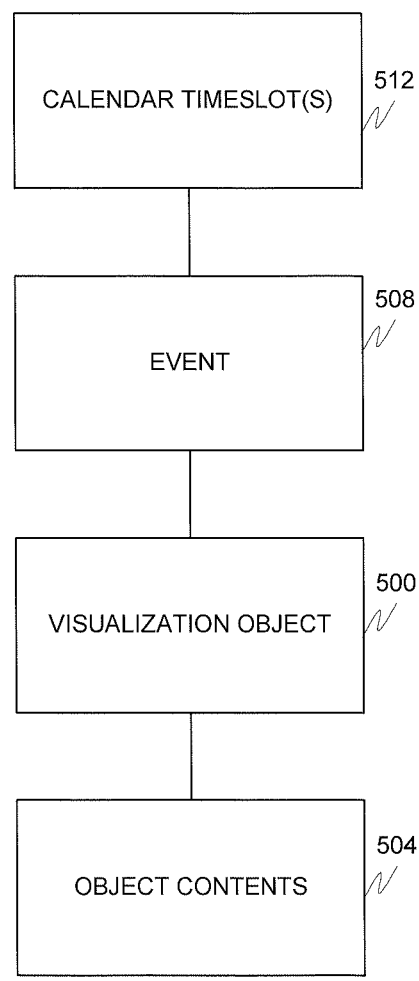
FIG. 5 depicts a set of data structures according to an embodiment.

With reference to FIG. 5, the visualization object 500 (and its contents 504) can be linked or otherwise associated with an event, such as a conference session invitation data structure 508, which is in turn associated with a calendar timeslot(s) 512 (which is a specified month, day, year and time interval). The visualization object 500 is depicted in the calendar as an attachment to the calendar timeslot(s) 512. The object 500 can be empty before the conference session occurs and populated with the information related to the conference session during and/or after the session concludes. For example, it may also be populated with, commentary added after the session concludes. It remains attached to the calendar timeslot(s) 512 after the conference session is completed.

In other configurations, the visualization object 500 and/or object contents 504 include other (multiple) objects typically of the same type. The embedded objects, for example, can be rendered as pointers or links to other objects or the actual contents of the embedded object. Other rendering techniques known to those of ordinary skill in the art can also be used. By this technique, one could peruse not only his or her calendar but also any other calendar, even of other participants.

A subscriber, corresponding to the electronic calendar, can initiate the process of viewing the object's contents 504 by clicking on the attached object 500 or 800. In one configuration, all or portion of the object is secured by an access control 808, such as a password. In other words, when the entire object 500 is secured, the subscriber must enter a password to open the object. When only a portion of the object's contents 504 is secured, the secured contents are shown as solid lines for audio streams or blank documents for video images. If the user selects the password protected audio stream or document, he or she must first enter a password before the user can access the password protected content. Alternatively, login credentials, with or without a password, can be used to provide security.

Figure 6:
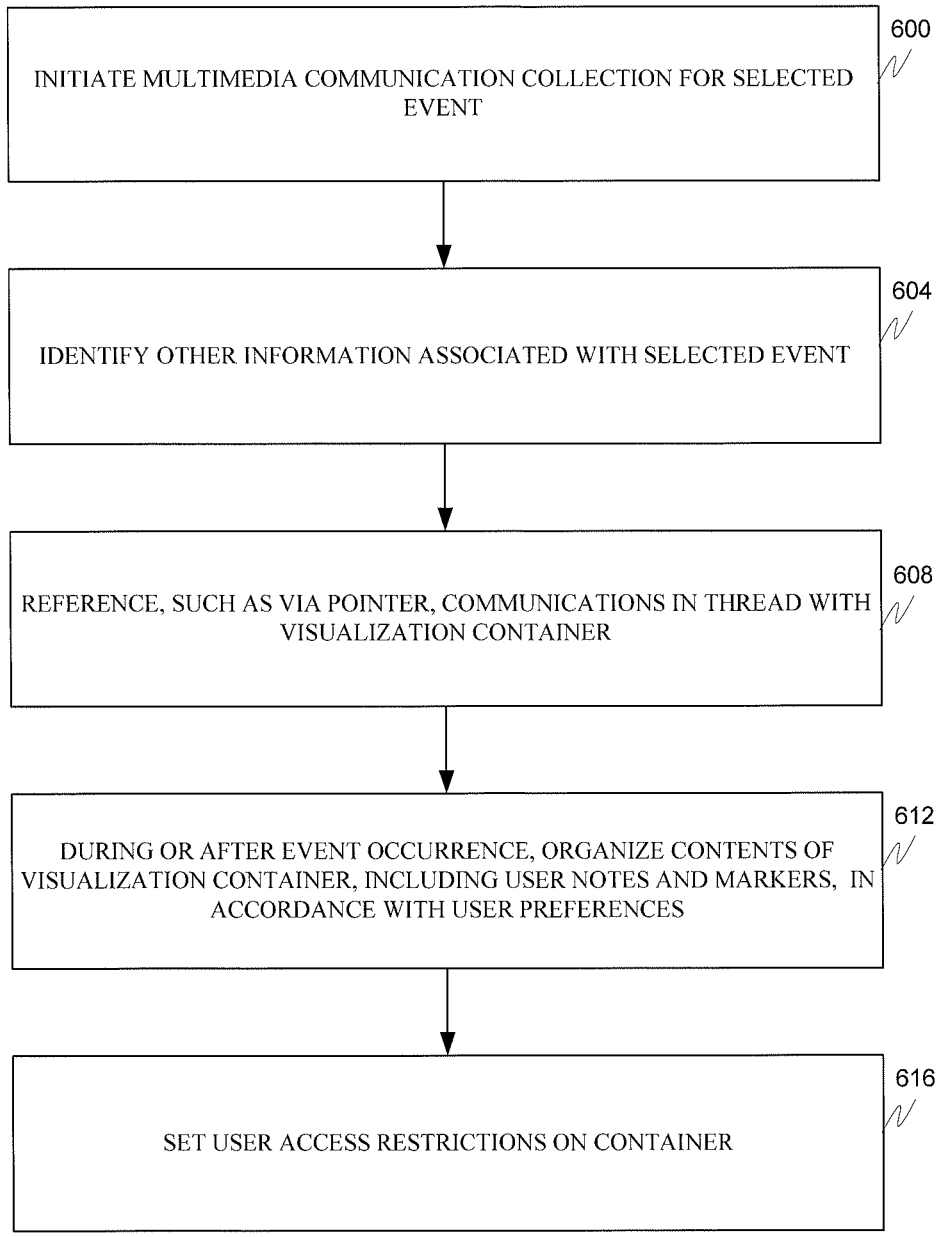
FIG. 6 is a flow chart according to an embodiment.
Figure 8:
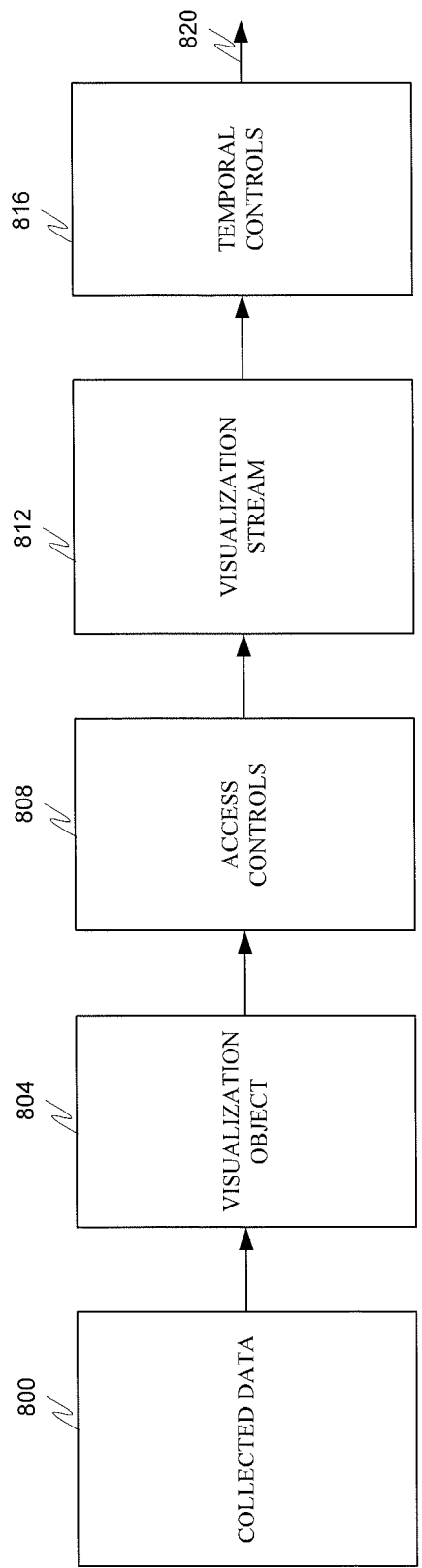
FIG. 8 is a block diagram according to an embodiment.

The operation of the event association module 190 will now be discussed with reference to FIGS. 6 and 8.

In step 600, a participant, typically the host or other manual or automated mechanism, starts synchronized recording of a conference session. This command will cause immediate recording, by the communication server 120 or other computational component, of the voice and video (multimedia) streams exchanged, via the conference bridge or server 140, among the various internal and external communication devices to the session; that is, the command would cause synchronized recording of the conference session or of the combined web and audio content. These streams would include, for example, not only the streams but any other information controlled by the conferencing application in the communication server 120. Such information would include, for example, pushed power point slides or slide show, annotated documents, white boarding images, text chat messages, polling and instant tabulation, desktop sharing, application sharing, streamed audio and video, roster display of participants, and discussion windows that provide keyboard chatting.

In step 604, the event association module 190 identifies other information potentially related to the session. Such information can include, for example, mid-session participant communications, such as voice calls, instant messages, emails, text chat, and the like with nonparticipants, documents created by a participant during the conference session, and the like. To collect such information, the event association module 190 uses the roster list of participants to collect electronic communication addresses associated with the various participants. In an enterprise network, the event association module 190 searches the enterprise database 144 for communication addresses, e.g., email addresses, instant messaging handles, telephone numbers, and the like, associated with each enterprise conference participant. The event association module 190 then tracks, via the communication server 120, all of the communications received or sent by one of the enterprise subscribers during the session. The module further determines what, if any, documents were created on a communication device associated with each of the enterprise subscribers during the session. For non-enterprise participants, the event association module 190 can obtain presence and availability information, via the presence service 112, that includes the currently available and associated communication device addresses of each such participant.

Once the information is collected (collectively the collected data 800), the event association module 190 performs rule-based filtering of the potentially related information to determine what potentially relevant information is statistically likely to be related to the session. What rules are applied can vary. Under one rule, potentially related information is captured as visualization object contents if the communications involve at least two different conference participants. Under another rule, potentially related information is captured if the communications involve one conference participant. Under another rule, potentially related information is captured if it contains one or more keywords received from the user (subscriber), the calendar entry or event description, and/or a textual analysis of the various multimedia streams recorded in step 600. Under another rule, potentially related information is captured if it is generated or created by a subscriber participant during the session. Under another rule, potentially relevant information is ignored if the subscriber has indicated, as a preference, that such type of information, such as an instant message thread with a certain electronic address or with a non-participant, is not to be associated with a visualization object. Where multiple subscribers are involved in a common conference session, certain types of potentially related information, such as private keyboard or text chat messages, or audio conversations, such as an audio stream received via a whisper page function, and private documents, are password and/or login protected by access controls 808 as set forth above.

In step 608, the event association module 190 references, such as via pointers, related communications (not recorded directly by the conferencing application) and the information recorded by the conferencing application with a data structure representing the visualization object.

In step 612, before, during or after the event (conference session) occurrence, the contents of the visualization object are organized in accordance with the respective subscriber preferences, saved in the visualization object, and, optionally, appended to the subscriber's calendar as noted above. The contents can be organized as discussed above, such as in the manner shown by FIGS. 2-4. In one configuration, this is done by linking differing documents or versions of documents or displays to a common frame (and/or its subframes) that corresponds to a selected point in time referenced to the timeline. For a temporally changing display, such as a whiteboard or desktop or application sharing display, the changing images can be captured as timestamped screen shots. Electronic documents generated or edited during the session, such as by document annotation and word processing functions, the various versions of the documents can be periodically saved and timestamped. The movie-type presentation results from presenting the various frames of the visualization stream 812 in the same manner as a movie.

The collected data 800 can be rendered as a visualization stream 812 by other techniques. In one technique, the collected data 800 is rendered by a markup language (e.g., Hypertext Markup Language or HTML) or a flash page. In either case, universal resource locators, hyperlinks, or other identifiers are associated with display segments. By way of example, each display segment may incorporate elements from other websites with suitable markup anchors. Different collected data 800 is temporally displayed as the visualization stream 812 in the various display segments, in synchronized fashion, relative to the common timeline. In another technique, the enterprise database 144 serves up the visualization stream 812 as a real time movie. In another technique, the database serves up metadescriptions of the collected data 800, and the visualization module 180 intelligently converts the metadescriptions into the visualization stream 812.

Regardless of the technique employed, temporal controls 812 are optionally applied to the visualization stream 812, and the altered visualization stream 812 is forwarded to the visualization module 180 for provision to the user.

In step 616, user access restrictions or controls 808 are set on the appended object. As noted, a first object of a first subscriber can have a first set of access restrictions while a second object of a second subscriber has a different second set of access restrictions. Although the first and second objects pertain to a common conference session, they can have different contents. It is also possible that the first and second objects contain the same contents, with private content being password-protected.

Figure 7:
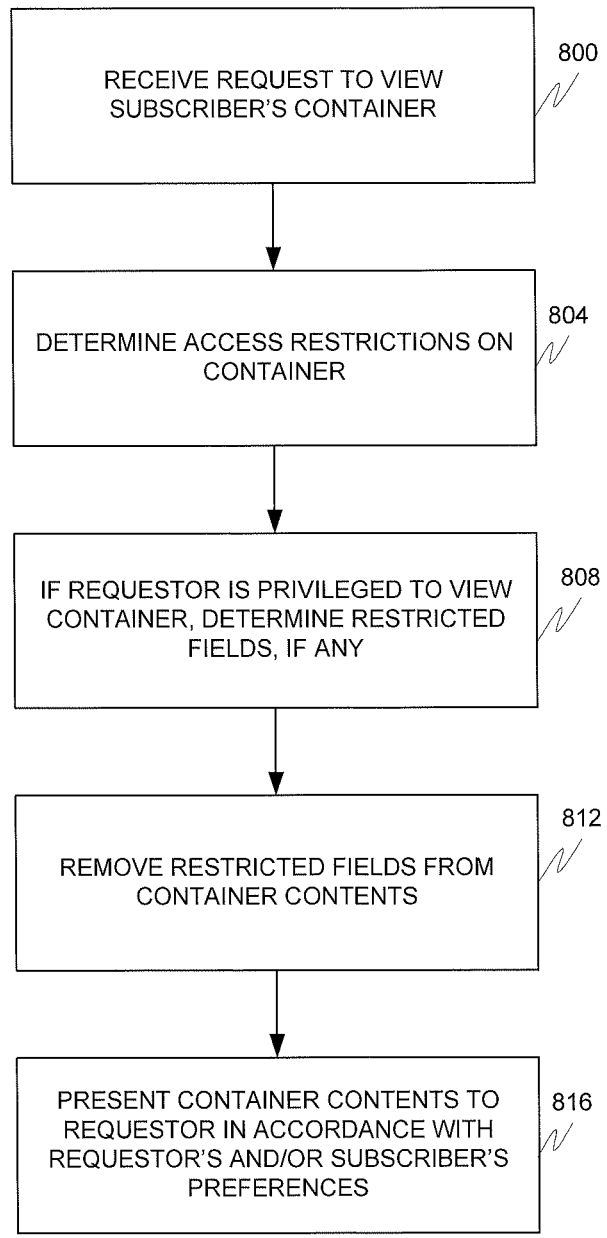
FIG. 7 is a flow chart according to an embodiment.

The operation of the communication visualization module 180 will now be discussed with reference to FIG. 7.

In step 800, the module 180 receives a request from a subscriber requestor to view the visualization object appended to a calendar entry of the subscriber. This request can take any form, such as a simple click by a cursor on the appended icon.

In step 804, the module 180 determines if there are any access restrictions on the object. This is done, for example, to determine if the subscriber has marked the object, as a whole, as being private. When access restrictions are in effect the module 180 determines if the requestor is privileged to view the object. The requestor is deemed to be privileged when he or she can properly provide the login credentials.

In step 808, the module 180 determines if there are any restricted fields, or content, in the object. In one configuration, an object can include private information from multiple subscriber participants to the session.

In step 812, the module 180 removes, or otherwise restricts view of, the restricted fields or contents.

In step 816, the module 180 presents the filtered object contents to the requestor in accordance with the requestor's and/or subscriber's preferences.

The exemplary systems and methods of this disclosure have been described in relation to a communication system. However, to avoid unnecessarily obscuring the present disclosure, the preceding description omits a number of known structures and devices. This omission is not to be construed as a limitation of the scopes of the claims. Specific details are set forth to provide an understanding of the present disclosure. It should however be appreciated that the present disclosure may be practiced in a variety of ways beyond the specific detail set forth herein.

A number of variations and modifications of the disclosure can be used. It would be possible to provide for some features of the disclosure without providing others.

For example in one alternative embodiment, the disclosure applies to time dependent objects besides meetings. While meetings offer clear examples for pivots, pivots can be organized around schedules (of which meetings are objects that one could zoom in on). In other words, the primary display segment would include a representation of the schedule, whether yearly, monthly, or daily, and the secondary display segments would include the various calendared events 508 during the depicted time frame. By selecting a calendared event, the user can transition into a presentation, such as that in FIGS. 2-4, with the primary segment transitioning from the calendar timeslots into the contents of the visualization object 500.

In another alternative embodiment, the primary and secondary segments can provide a useful way to visualize blog postings, source code control activities, email threads, instant messaging threads, text chat threads, or anything else that moves in time. The blog posting for example would present each separate blog entry, email, instant message, or text chat message as a time indexed image, such as images 216*a-p*. An example of source code control activities includes viewing, in the primary segment, a record of source code or file changes maintained by a second computer. The individual changes would be shown in the secondary segments. A similar visual presentation approach could be used for tracking history of changes to a document.

In yet another embodiment, the principles of this disclosure are applied to an educational setting to record and organize an educational lecture.

In yet another embodiment, a movie is presented in a manner similar to that shown in FIGS. 2-4. Selected movie (still) frames would appear in the secondary segments with the movie playing in the primary segment. The still frames would mark when in the movie certain events of interest occurred. The user could select a still frame or a temporally near point in time in the primary segment and jump forward to the desired scene.

In yet another embodiment, the systems and methods of this disclosure can be implemented in conjunction with a special purpose computer, a programmed microprocessor or microcontroller and peripheral integrated circuit element(s), an ASIC or other integrated circuit, a digital signal processor, a hard-wired electronic or logic circuit such as discrete element circuit, a programmable logic device or gate array such as PLD, PLA, FPGA, PAL, special purpose computer, any comparable means, or the like. In general, any device(s) or means capable of implementing the methodology illustrated herein can be used to implement the various aspects of this disclosure. Exemplary hardware that can be used for the disclosed embodiments, configurations and aspects includes computers, handheld devices, telephones (e.g., cellular, Internet enabled, digital, analog, hybrids, and others), and other hardware known in the art. Some of these devices include processors (e.g., a single or multiple microprocessors), memory, nonvolatile storage, input devices, and output devices. Furthermore, alternative software implementations including, but not limited to, distributed processing or component/object distributed processing, parallel processing, or virtual machine processing can also be constructed to implement the methods described herein.

In yet another embodiment, the disclosed methods may be readily implemented in conjunction with software using object or object-oriented software development environments that provide portable source code that can be used on a variety of computer or workstation platforms. Alternatively, the disclosed system may be implemented partially or fully in hardware using standard logic circuits or VLSI design. Whether software or hardware is used to implement the systems in accordance with this disclosure is dependent on the speed and/or efficiency requirements of the system, the particular function, and the particular software or hardware systems or microprocessor or microcomputer systems being utilized.

In yet another embodiment, the disclosed methods may be partially implemented in software that can be stored on a storage medium, executed on programmed general-purpose computer with the cooperation of a controller and memory, a special purpose computer, a microprocessor, or the like. In these instances, the systems and methods of this disclosure can be implemented as program embedded on personal computer such as an applet, JAVA® or CGI script, as a resource residing on a server or computer workstation, as a routine embedded in a dedicated measurement system, system component, or the like. The system can also be implemented by physically incorporating the system and/or method into a software and/or hardware system.

Although the present disclosure describes components and functions implemented in the embodiments with reference to particular standards and protocols, the embodiments, configurations, and aspects are not limited to such standards and protocols. Other similar standards and protocols not mentioned herein are in existence and are considered to be included in the present disclosure. Moreover, the standards and protocols mentioned herein and other similar standards and protocols not mentioned herein are periodically superseded by faster or more effective equivalents having essentially the same functions. Such replacement standards and protocols having the same functions are considered equivalents included in the present disclosure.

The present disclosure, in various embodiments, configurations, and aspects, includes components, methods, processes, systems and/or apparatus substantially as depicted and described herein, including various embodiments, subcombinations, and subsets thereof. Those of skill in the art will understand how to make and use the disclosed embodiments, configurations, and aspects after understanding the present disclosure. The present disclosure, in various embodiments, configurations, and aspects, includes providing devices and processes in the absence of items not depicted and/or described herein or in various embodiments, configurations, or aspects hereof, including in the absence of such items as may have been used in previous devices or processes, e.g., for improving performance, achieving ease and\or reducing cost of implementation.

The foregoing discussion has been presented for purposes of illustration and description. The foregoing is not intended to limit the disclosure to the form or forms disclosed herein. In the foregoing Detailed Description for example, various features of the disclosure are grouped together in one or more embodiments, configurations, or aspects for the purpose of streamlining the disclosure. The features of the embodiments, configurations, or aspects of the disclosure may be combined in alternate embodiments, configurations, or aspects other than those discussed above. This method of disclosure is not to be interpreted as reflecting an intention that the claims require more features than are expressly recited in each claim. Rather, as the following claims reflect, inventive aspects lie in less than all features of a single foregoing disclosed embodiment, configuration, or aspect. Thus, the following claims are hereby incorporated into this Detailed Description, with each claim standing on its own as a separate preferred embodiment of the disclosure.

Moreover, though the description has included description of one or more embodiments, configurations, or aspects and certain variations and modifications, other variations, combinations, and modifications are within the scope of the disclosure, e.g., as may be within the skill and knowledge of those in the art, after understanding the present disclosure. It is intended to obtain rights which include alternative embodiments, configurations, or aspects to the extent permitted, including alternate, interchangeable and/or equivalent structures, functions, ranges or steps to those claimed, whether or not such alternate, interchangeable and/or equivalent structures, functions, ranges or steps are disclosed herein, and without intending to publicly dedicate any patentable subject matter.

What is claimed is:

1. A communication system, comprising:
a microprocessor; and
a computer readable medium, coupled with the microprocessor and comprising microprocessor readable and executable instructions that program the microprocessor to:
receive, during a selected time period, a plurality of different media streams exchanged, over a communications network, in one or more communications between a plurality of parties;
generate a multimedia presentation of the plurality of different media streams, wherein the multimedia presentation comprises a plurality of display segments associated with a plurality of: (i) sequential video images from the plurality of different media streams, (ii) at least one audio or video stream from the plurality of different media streams, (iii) one or more text messages from the plurality of different media streams, (iv) any other temporal data stream, and (v) at least one information accessed or created by one of the plurality of parties, the information not being included in the plurality of different media streams and wherein, in the multimedia presentation, different media streams are referenced according to a common time scale;
generate for display, the multimedia presentation to a requestor, wherein the plurality of different media streams are associated with a multimedia session between the plurality of parties, wherein an event association module determines that at least one communication transmitted, by one of the plurality of parties using a first communication device, during the multimedia session, is related to the multimedia session, wherein the at least one communication is not transmitted as part of the multimedia session, wherein the one of the plurality of parties is participating in the multimedia presentation using a second communication device and associates, in the multimedia presentation, a recorded version of the at least one communication with the one or more media streams, and wherein the at least one communication is between the at least one of the plurality of parties and a nonparticipant;
during the multimedia session, determine an electronic address of the first communication device of the one of the plurality of parties; and
track, during the multimedia session, using the electronic address of the first communication device of the one of the multiple participants, a plurality of communications that are separate from the multimedia presentation and sent and received by the first communication device using the electronic address, wherein the at least one communication is one of the plurality of communications that are separate from the conference session.

2. The system of claim 1, wherein the plurality of different media streams comprise a plurality of an audio conversation between two or more of the parties, video images of at least one or more of the parties, instant messages exchanged between two or more of the parties, email messages exchanged between two or more of the parties, text chat messages exchanged between two or more of the parties, keyboard chat between two or more of the parties, whiteboard session, desktop sharing session, application sharing session, and power point session.

3. The system of claim 1, wherein each of the display segments contains a graphical representation of a different media stream and wherein the plurality of display segments are associated with (i) sequential video images from the plurality of different media streams, (ii) at least one audio or video stream from the plurality of different media streams, (iii) one or more text messages from the plurality of different media streams, (iv) any other temporal data stream, and (v) at least one information accessed or created by one of the plurality of parties, the information not being included in the plurality of different media streams.

4. The system of claim 3, wherein the multimedia presentation, when activated, present the progressions of the different media streams as a function of time.

5. The system of claim 4, wherein a first display segment contains a set of text messages between the parties, a second display segment contains a set of voice communications between the parties, and a third display segment contains a video representation of a whiteboard session, a desktop sharing session, an application sharing session, and a power point session.

6. The system of claim 5, wherein the multimedia presentation comprises one or more objects embedded in an object of the same type.

7. The system of claim 1, wherein a first media stream of the plurality of media streams is a pivot and is in a primary display segment, wherein a user selects a second media stream in a secondary display segment as a new pivot, and wherein a processor, in response to the user selection, reorders the multimedia presentation, whereby the second media stream is in the primary display segment and the first media stream is in the secondary display segment.

8. The system of claim 1, wherein a user selects an event along a selected one of the plurality of media streams to navigate to and wherein a processor, in response to the event selection, one of fast forwards and fast reverse automatically to the selected event.

9. The system of claim 1, wherein the transmission of the at least one communication is not controlled by a conferencing application effecting the conference session.

10. The system of claim 9, wherein the at least one communication is one or more of an instant message and an email and wherein the one or more media streams comprise audio information.

11. A method comprising:
receive, by a microprocessor, during a selected time period, a plurality of different media streams exchanged, over a communications network, in one or more communications between a plurality of parties;
generate, by the microprocessor, a multimedia presentation of the plurality of different media streams, wherein the multimedia presentation comprises a plurality of display segments associated with a plurality of: (i) sequential video images from the plurality of different media streams, (ii) at least one audio or video stream from the plurality of different media streams, (iii) one or more text messages from the plurality of different media streams, (iv) any other temporal data stream, and (v) at least one information accessed or created by one of the plurality of parties, the information not being included in the plurality of different media streams and wherein, in the multimedia presentation, different media streams are referenced according to a common time scale;

generate for display, by the microprocessor, the multimedia presentation to a requestor, wherein the plurality of different media streams are associated with a multimedia session between the plurality of parties, wherein an event association module determines that at least one communication transmitted, by one of the plurality of parties using a first communication device, during the multimedia session, is related to the multimedia session, wherein the at least one communication is not transmitted as part of the multimedia session, wherein the one of the plurality of parties is participating in the multimedia presentation using a second communication device and associates, in the multimedia presentation, a recorded version of the at least one communication with the one or more media streams, and wherein the at least one communication is between the at least one of the plurality of parties and a nonparticipant;

during the multimedia session, determine, by the microprocessor, an electronic address of the first communication device of the one of the plurality of parties; and track, by the microprocessor, during the multimedia session, and using the electronic address of the first communication device of the one of the multiple participants, a plurality of communications that are separate from the multimedia presentation and sent and received by the first communication device using the electronic address, wherein the at least one communication is one of the plurality of communications that are separate from the conference session.

12. The system of claim 11, wherein the plurality of different media streams are associated with a multimedia session between the plurality of parties and wherein the plurality of different media streams comprise a plurality of an audio conversation between two or more of the parties, video images of at least one or more of the parties, instant messages exchanged between two or more of the parties, email messages exchanged between two or more of the parties, text chat messages exchanged between two or more of the parties, keyboard chat between two or more of the parties, whiteboard session, desktop sharing session, application sharing session, and power point session.

13. The system of claim 11, wherein each of the display segments contains a graphical representation of a different media stream and wherein the plurality of display segments are associated with (i) sequential video images from the plurality of different media streams, (ii) at least one audio or video stream from the plurality of different media streams, (iii) one or more text messages from the plurality of different media streams, (iv) any other temporal data stream, and (v) at least one information accessed or created by one of the plurality of parties, the information not being included in the plurality of different media streams.

14. The system of claim 11, wherein the multimedia presentation, when activated, present the progressions of the different media streams as a function of time.

15. The system of claim 14, wherein a first display segment contains a set of text messages between the parties, a second display segment contains a set of voice communications between the parties, and a third display segment contains a video representation of a whiteboard session, a desktop sharing session, an application sharing session, and a power point session.

16. The system of claim 15, wherein the multimedia presentation comprises one or more objects embedded in an object of the same type.

17. The system of claim 11, wherein a first media stream of the plurality of media streams is a pivot and is in a primary display segment, wherein a user selects a second media stream in a secondary display segment as a new pivot, and wherein a processor, in response to the user selection, reorders the multimedia presentation, whereby the second media stream is in the primary display segment and the first media stream is in the secondary display segment.

18. The system of claim 11, wherein a user selects an event along a selected one of the plurality of media streams to navigate to and wherein a processor, in response to the event selection, one of fast forwards and fast reverse automatically to the selected event.

19. The method of claim 11, wherein the transmission of the at least one communication is not controlled by a conferencing application effecting the conference session.

20. The method of claim 19, wherein the at least one communication is one or more of an instant message and an email and wherein the one or more media streams comprise audio information.

* * * * *